(12) United States Patent
Isert et al.

(10) Patent No.: US 9,207,097 B2
(45) Date of Patent: Dec. 8, 2015

(54) METHOD FOR OPERATING AN INFORMATION SYSTEM, USER DEVICE AND INFORMATION SYSTEM

(75) Inventors: Carsten Isert, Munich (DE); Robert Hein, Blonhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 953 days.

(21) Appl. No.: 13/044,919

(22) Filed: Mar. 10, 2011

(65) Prior Publication Data

US 2011/0225532 A1    Sep. 15, 2011

(30) Foreign Application Priority Data

Mar. 10, 2010 (DE) .......................... 10 2010 002 741

(51) Int. Cl.
*G06F 3/033* (2013.01)
*G01C 21/36* (2006.01)
*G06Q 10/04* (2012.01)
*H04W 4/04* (2009.01)
*H04W 4/02* (2009.01)

(52) U.S. Cl.
CPC ........ *G01C 21/3679* (2013.01); *G01C 21/3617* (2013.01); *G06Q 10/047* (2013.01); *H04W 4/04* (2013.01); *H04W 4/02* (2013.01)

(58) Field of Classification Search
CPC ...... G06F 8/34; G08G 1/0969; G08G 1/0968; G01C 21/3635
USPC .................... 715/771; 701/409, 418, 426, 438
See application file for complete search history.

(56) References Cited

U.S. PATENT DOCUMENTS

| 7,099,835 B2* | 8/2006 | Williams, III | 701/515 |
| 2005/0131637 A1 | 6/2005 | Chu et al. | |
| 2007/0027628 A1* | 2/2007 | Geelen | 701/213 |
| 2009/0138194 A1 | 5/2009 | Geelen | |
| 2010/0138151 A1* | 6/2010 | Jang et al. | 701/201 |

FOREIGN PATENT DOCUMENTS

| EP | 1 241 651 B1 | 2/2005 |
| EP | 1 300 809 B1 | 12/2008 |

OTHER PUBLICATIONS

German Search Report dated Aug. 24, 2010, including partial English translation (nine (9) pages).

* cited by examiner

*Primary Examiner* — Haoshian Shih
(74) *Attorney, Agent, or Firm* — Crowell & Moring LLP

(57) ABSTRACT

An information system includes a central computer system and at least one user device. The central computer system has a database and an interface for communicating with a user device. The database is designed for storing personalized information with reference to a location and program functions with reference to a location. The database is also designed for synchronizing the personalized information and/or program functions with the respective user device. For this purpose, the user device is configured so as to determine a position of a moveable object as a function of at least one position-measuring signal and to provide, as a function of the determined position, personalized information with reference to a location and/or a program function with reference to a location.

16 Claims, 3 Drawing Sheets

METHOD FOR OPERATING AN INFORMATION SYSTEM, USER DEVICE AND INFORMATION SYSTEM

CROSS-REFERENCE TO RELATED APPLICATION

This application claims priority under 35 U.S.C. §119 from German Patent Application No. DE 10 2010 002 741.3, filed Mar. 10, 2010, the entire disclosure of which is herein expressly incorporated by reference.

BACKGROUND AND SUMMARY OF THE INVENTION

The invention relates to a method for operating an information system, a user device and an information system.

In the automobile environment there is an increasing demand for high quality information systems that conveniently provide the user—in particular, a vehicle passenger—with information. For example, navigation systems are used widely in modern motor vehicles.

It is customary to gather information about a trip at home or in the office. For example, printed maps, atlases, travel guides or the like are used for this purpose. In addition, digital media, such as Internet web pages, e-mail, etc. are also used. Then the user has to prepare by hand the information for the trip. On the one hand, the information can be recorded in writing, printed out or noted. In this context it routinely happens that, for example, one forgets to take along the printed out information or also forgets the noted information. Moreover, the collected information is usually not categorized and can be searched only with difficulty.

US 2005/0131637 A1 discloses a method for recording and storing a plurality of points and times along a route that is traveled by a user. Then the position data are uploaded into a data processing system, and the pictures that were taken with a digital camera are also uploaded into the data processing system. Then the pictures are assigned to the positions along the route that were determined as a function of the time at which the pictures were taken, in order to generate a personal map. Afterwards the pictures can be selected by clicking on the respective picture on the map.

The engineering object of the invention with respect to one aspect is to provide a method for operating an information system that is convenient. With respect to another aspect the engineering object of the invention is to provide a user device that is convenient. Furthermore, the engineering object of the invention is to provide an information system that is convenient.

According to a first aspect, the invention is characterized by a method for operating an information system, in which a position of a moveable object is determined as a function of at least one position-measuring signal, and in which personalized information with reference to a location and/or a program function with reference to a location is (are) provided as a function of the determined position.

In this way the respective personalized information can be provided to the respective user in a very targeted manner and, in so doing, makes it possible to present to the user only the information that he most likely will actually need based on the current position of the moveable object. This method offers an easy way to make a technical contribution that diverts the user's attention no more than necessary from other tasks, such as steering a vehicle.

The personalized information is assigned at least one reference to a location, and personalized information can be, for example, pointers to web pages, like hyperlinks, e-mails or corresponding links, electronic documents as text or table via graphical representation or associated links. Furthermore, the personalized information can also be photos, videos, music pieces, audio books, calendar entries, contacts, academic articles, travel guide information and/or electronic tickets, for example for a flight, for the train, for hotels or the like, and/or admission tickets. Furthermore, the personalized information can also be, for example, electronically available invoices and/or 3D model displays and/or references to objects via RFID [radio frequency identification] elements and/or access data, such as frequent flyer programs, air miles system, rental car companies or the like. Furthermore, the personalized information can also include, for example, access data for payment systems. Moreover, the personalized information can also include evaluations performed by the user himself or evaluations performed by a third party, snapshots and/or videos and/or voice memos. Furthermore, the personalized information can also include play counters of music and video pieces, general usage information of contents, descriptions, traveled routes and/or events on the traveled routes or at the destination.

Program functions are provided, for example, by a parking garage operator as a respective plug-in that then enables a so-called drive-thru payment. Furthermore, a respective program function can also make automatically, for example, a variety of lighting adjustments—at least location-specific lighting adjustments—inside the vehicle and/or automatically preset the exterior lighting adjustments of the vehicle. Another example for a corresponding program function is a function that enables a side view camera to be automatically activated when a vehicle is exiting an unmonitorable underground parking garage.

One advantageous embodiment of the first aspect determines a current time and provides personalized information with reference to a location and with reference to time and/or at least one program function with reference to a location and with reference to time, as a function of the determined position. In this way it is also possible to carry out an even more targeted selection of the available information or more specifically program functionality. An additional advantageous embodiment of the first aspect provides the personalized information in the form of an optical output or an output over a communications interface and/or provides the program function in the form of processing the function.

According to a second aspect, the invention is characterized by a method for operating an information system, in which the personalized information and/or a program function is assigned the location reference in the form of WGS coordinates by pulling and graphically placing a respective symbol for the respective personalized information or more specifically the program function on a graphic representation of a geographic region by means of a graphical user interface. In this context WGS is the abbreviation for world geodetic system. This arrangement makes it possible to assign the location reference in a user-friendly way to the respective personalized information or more specifically to the program function. Thus, the respective personalized information or also program function from a plurality of applications can be integrated in an especially simple way, and, thus, a so-called personalized map can be generated in an especially simple way so that the user does not have to make time consuming inputs or have to enter by hand the respective WGS coordinates or other geographic coordinates.

According to an advantageous embodiment of the second aspect, the location reference in the form of WGS coordinates and additional map-based additional geographic information is assigned by pulling and graphically placing the symbol for the respective personalized information or more specifically the program function on the graphic representation of a geographic region. In this way, the personalized information, or more specifically the program function can be assigned an even more accurate location reference.

According to an advantageous embodiment of the second aspect, the alphanumeric address data assigned to the personalized information are transformed into geographic coordinates by means of a transformation module and are assigned, as the location reference, to the personalized information. This feature makes it especially easy to generate suitable location references for the user, and, if desired, even more precise location references can be generated than would be the case, for example, with WGS 84 coordinates.

According to an additional advantageous embodiment of the second aspect, a matching of the WGS coordinates with the geographic coordinates, determined with the transformation module, is carried out, and the respective location reference of the respective program function or more specifically the personalized information is adapted as a function of the matching. In this way it is possible to adjust the location reference in an especially reliable and precise manner, so that the user does not have to actively intervene here.

In addition, an additional advantageous embodiment of the second aspect assigns a route to the respective personalized information. This strategy makes it especially easy to also provide route-specific personalized information. The same also applies to the respective program function with reference to a location. According to another advantageous embodiment of the second aspect, the personalized information and/or the respective program function is (are) assigned a user reference. In this way the respective information and/or the respective program function can be suitably provided so as to be personalized to the respective user in an especially easy way.

A third aspect provides a user device that is designed to carry out a method according to the first and the second aspect.

According to another advantageous embodiment of the third aspect, the user device has an interface that is capable of communicating with a central computer system and that can send the personalized information and/or a program function to the central computer system and/or can receive from the central computer system. This arrangement enables an especially simple and reliable communication with the central computer system.

Another advantageous embodiment of the third aspect designs the user device for a fixed arrangement in a vehicle. An additional advantageous embodiment of the third aspect configures the user device as a mobile terminal device with a mobile communications interface.

A fourth aspect provides an information system with a central computer system and at least one user device according to the third aspect.

The central computer system comprises a database and an interface for communicating with a user device according to the third aspect. In this case the database is designed for storing personalized information with reference to a location and/or a location reference and a time reference and/or the program functions with reference to a location and/or a location reference and a time reference. Furthermore, the database is designed for synchronizing the personalized information or more specifically the program functions with the user device.

This feature permits easy and universal data maintenance with respect to the personalized information and also the program data with respect to the respective program function.

Furthermore, this feature makes it easy to provide, for example, the personalized information and/or the program function with reference to a location reference, and then the personalized information and/or the program function is (are) stored reliably in the database of the central computer system and can be provided in a consistent manner to the user device according to the first aspect.

According to an advantageous embodiment of the fourth aspect, the information system has a first user device, which is configured for a fixed arrangement in a vehicle, and a second user device, which is configured as a mobile terminal device with a mobile communications interface. In this way it is possible, if desired, to simply buffer the respective program function or personalized information at the mobile terminal device and to have a direct communication between the mobile terminal device and the user device that is configured for a fixed arrangement in the vehicle. This feature can be especially advantageous in situations, in which only a limited connection to the central computer system is possible.

In addition, the information system can also comprise a user device that is configured to assign to the personalized information a location reference and/or a location reference and a time reference. This can be achieved, for example, with a plug-in for a program application, such as a browser, an e-mail program or a text-processing or table-calculating program. Said plug-in can transmit the alphanumeric address data to the transformation module or can also transmit the personalized information.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
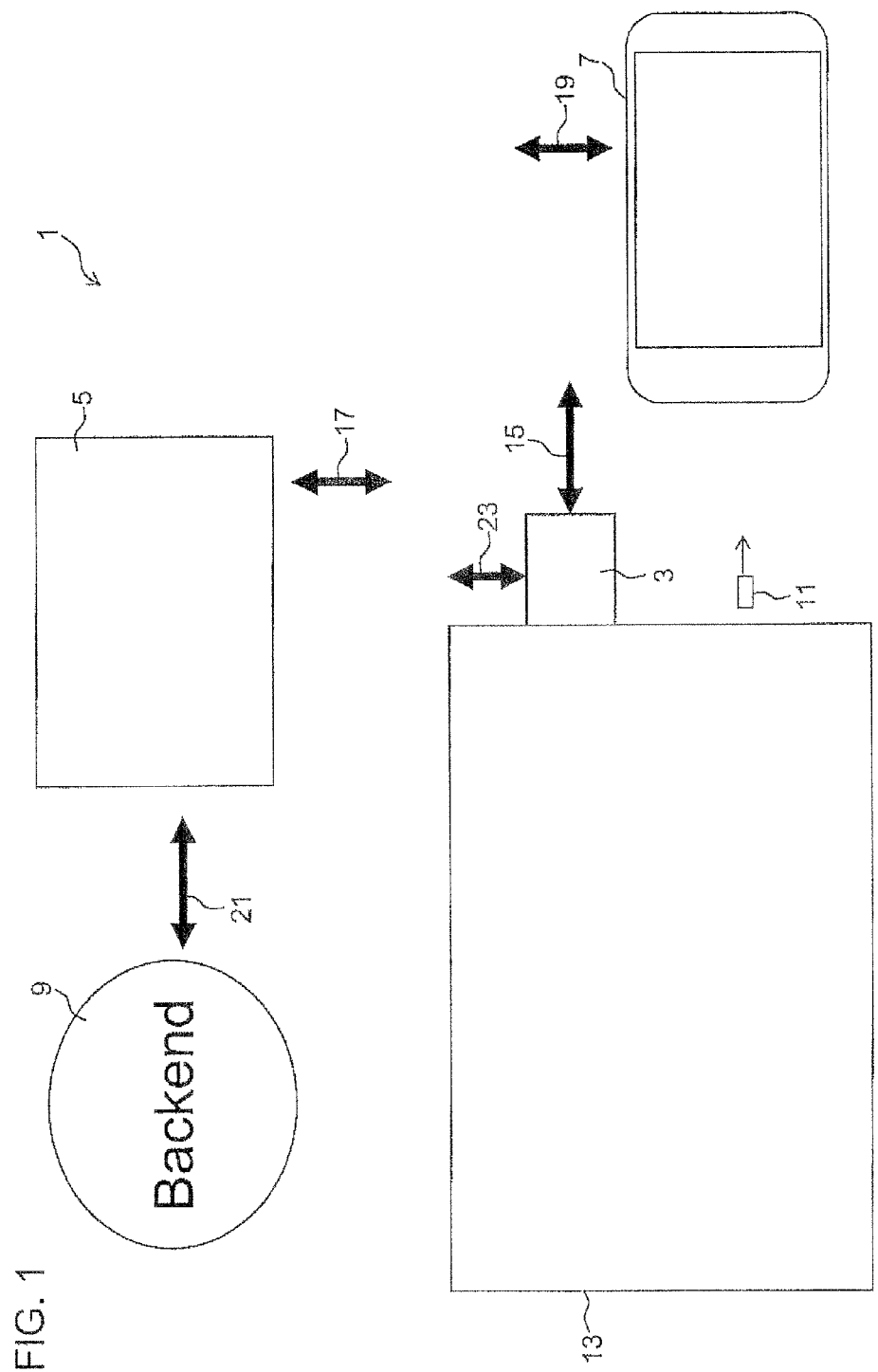
FIG. 1 shows an information system.

Elements that have identical construction or function are identified with the identical reference numerals and symbols in all of the figures.

An information system 1 (see FIG. 1) has at least one user device. In this case FIG. 1 shows a first user device 3, a second user device 5 and a third user device 7. Furthermore, the information system 1 includes a central computer system 9.

The first user device 3 is configured for a fixed arrangement in a vehicle and is securely mounted in the vehicle. The first user device 3 is assigned a position-determining device 11, which generates a position-measuring signal, on the basis of, for example, GPS signals. Furthermore, the first user device 3 is assigned an optical output device 13, which is mounted, for example, on an instrument panel of a vehicle, and can be, for example, a head unit.

The second user device 3 is configured preferably as a PC. In particular, the second user device 5 can also be configured, for example, as a notebook, netbook, tablet PC, PDA, personal navigation device, game console or the like.

The third user device 7 includes preferably a mobile phone—thus, in particular a mobile communications interface to a mobile communications network. Preferably, the third user device is constructed, for example, as a Smartphone. In particular, the third user device 7 is constructed as a mobile terminal device with the mobile communications interface. The third user device can also be constructed, for example, as a tablet PC, PDA, personal navigation device, etc. Furthermore, the third user device can also be mounted and/or operated in the vehicle. The third user device can also include a position-determining unit, like a GPS module.

The central computer system 9, which can be characterized as a back end, includes a database and an interface 21 for communicating with at least one of the user devices 5, 7, 3. The database is designed for storing personalized information with reference to a location and/or with reference to a location and with reference to time and/or the program functions with reference to a location and/or with reference to a location and with reference to time. Furthermore, the database is designed for synchronizing the personalized information or more specifically the program functions with the respective user device 3, 5, 7.

In this way it is possible to maintain the respective data in a consistent manner in the various user devices 3, 5, 7.

The user devices 3, 5, 7 have respective user device interfaces 15, 17, 19, which are designed to communicate at least with the central computer system 9 and preferably also with a respective other user device 3, 5, 7. The user device interfaces 15, 17, 19 can enable, for example, a wireless communications link, for example, over WLAN or Bluetooth or also a cable-linked communication, for example, by means of USB, iPod dock adapter and the like.

The first user device 3 is designed to determine the current position of the moveable object, which is, for example, a vehicle, as a function of the position signal. The personalized information with reference to a location and/or with reference to a location and with reference to time and/or a program function with reference to a location and/or a program function with reference to a location and with reference to time are provided as a function of the determined position. The personalized information is provided, for example, in the form of an optical output on the optical output device 13. However, it can also be achieved, for example, by outputting over the communications interface 23, which may be any interface known to the one of ordinary skill in the art. The respective program function is provided, for example, by processing the program function, during which an optical output or output over the communications interface 23 can occur at the same time.

The respective personalized information can include, for example, pointers to web pages, like hyperlinks, e-mails or corresponding links, graphical representation or associated links to electronic documents as text or table. Furthermore, the personalized information can also be photos, videos, music pieces, audio books, calendar entries, contacts, academic articles, travel guide information and/or electronic tickets, for example, for a flight, for the train, for hotels or the like, and/or admission tickets. Furthermore, the personalized information can also be, for example, electronically available invoices, 3D model displays, references to objects via RFID elements and/or access data, such as frequent flyer programs, air miles system, rental car companies or the like. Furthermore, the personalized information can also include, for example, access data for payment systems. Moreover, the personalized information can also include evaluations performed by the user himself or evaluations performed by a third party, snapshots and/or videos and/or voice memos. Furthermore, the personalized information can also include play counters of music and video pieces, general usage information of contents, descriptions and/or traveled routes. and/or events on the traveled routes or at the destination, and/or bank accounting information.

Program functions are provided, for example, by a parking garage operator as a respective plug-in that then enables a so-called drive-thru payment. Furthermore, the program functions can also make automatically, for example, a variety of lighting adjustments—at least location-specific lighting adjustments—inside the vehicle and/or automatically preset the exterior lighting adjustments of the vehicle.

Figure 2:
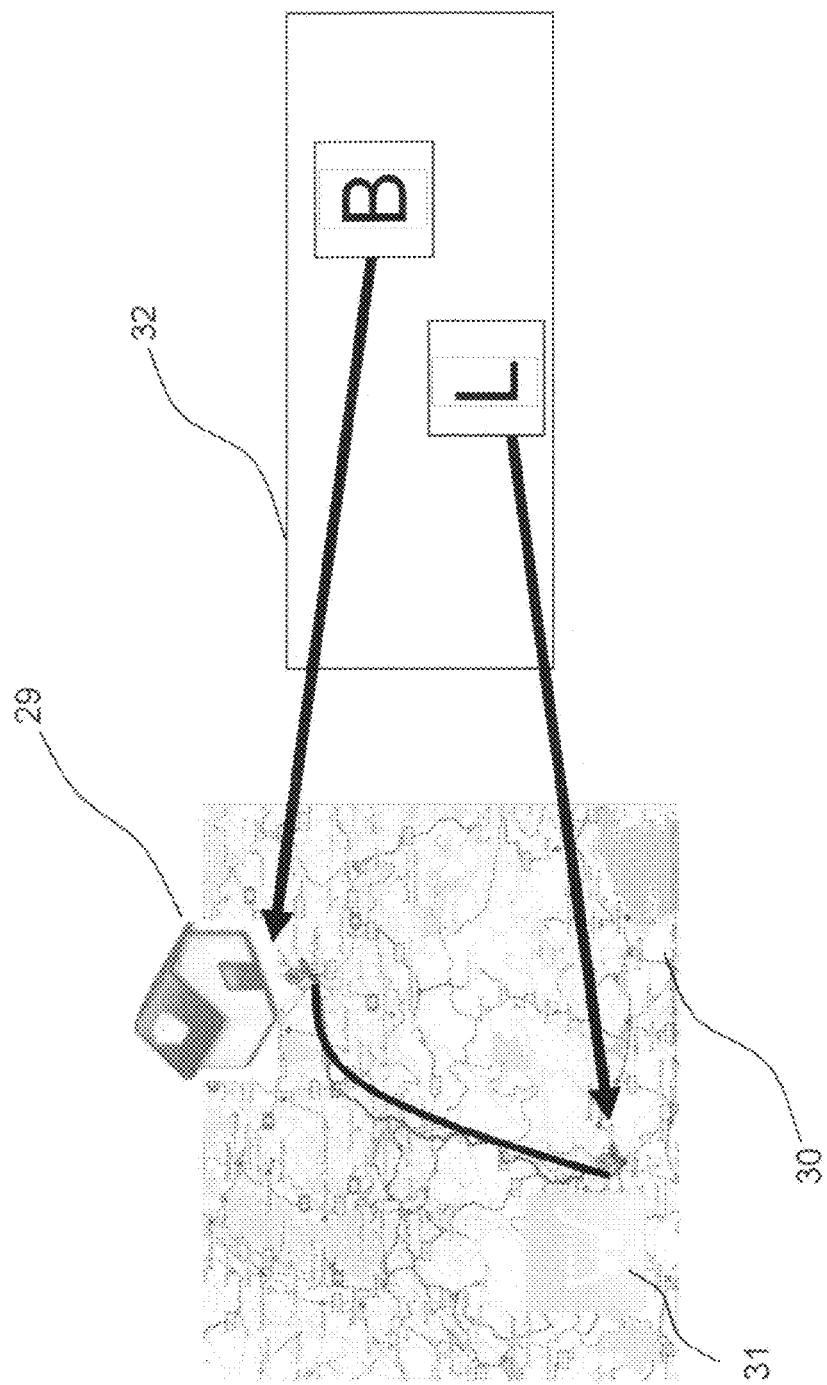
FIG. 2 shows a graphical user interface.

The second user device 5 includes a graphical user interface. The graphical user interface is designed to produce the location reference—that is, in the form of WGS coordinates—by pulling and graphically placing a symbol for the respective personalized information or more specifically the program function on a graphic representation 30 of a geographic region. For this purpose there is preferably an application that can be configured, for example, as an expansion of a web browser or as a dedicated application. This application is designed so as to enable a simple and universal operator control with especially the same look and feel. A block 32 in FIG. 2 represents a program application, such as a browser, which is provided preferably with its own plug-in. In principle, the graphical user interface can also be present in the second and/or third user device 5, 7.

The plug-in for the program application, such as a browser, an e-mail program or a text processing or table calculating program, can also be implemented in such a way that, for example, the alphanumeric address data are transferred to a transformation module or that, for example, personalized information is transmitted.

This feature allows the personalized information from a plurality of applications to be added as personalized information and to be combined with each other in any way.

For example, the personalized information can also be assigned to arbitrary routes between different locations. In this context even mere logic links are also possible.

Furthermore, the second user device 5—in particular, the graphical user interface—is also designed so as to directly influence the user with respect to the route that he will want to take from one place to a next place. Furthermore, the second user device is designed in such a way that destination times are established for route destinations. As a result, it can be managed, for example, that a trip to an airport shall take place on a day X at time Y.

The location reference can be assigned, for example, in the form of WGS coordinates by suitably pulling symbols and suitable graphical placement of the respective symbol for the respective personalized information or program function on the graphical representation 30 of the geographic region. To this end it is also possible to use additionally freely available map programs on the Internet and, if desired, by matching as necessary.

Moreover, the location reference in the form of WGS coordinates and additional map-based additional geographic information can be assigned to the personalized information or more specifically the program function on the graphical representation 30 of the geographic region. The additional geographic information can be representative, for example, for the exact side of the street—that is, for example, the north side of the street—Kaufingerstrasse—in Munich.

The symbols can exist, for example, in the form of a house 29 for the home for the respective user or also as a shopping cart 31 for a desired shopping destination. Furthermore, it is possible to provide, for example, an airport symbol 33 (see FIG. 3), a parking garage symbol 35, a gas station symbol 37, a rental station symbol 39, a hotel symbol 41, a public local transit symbol 43, an amusement park symbol 45, an information center symbol 47, a browser symbol 49 with an underlying link or an Internet lexicon symbol 51 with an underlying link.

Furthermore, the second user device 5 can comprise a transformation module that is designed to transform alphanumeric address data into geographic coordinates. For example, additional map information that is available on the central computer system 9 can also be used, for example, for this purpose. Then, if desired, extremely precise geographic coordinates, which can be assigned, as the location reference, to the respective personalized information, can be generated in this way. Thus, it is possible, for example, to manage and also provide detailed maps of particular environments, such as airports, amusement parks, shopping malls and so on for linking. These data items can be provided both in the central computer system 9 and also in the user devices 3, 5, 7. In addition, it is also possible to provide in this way detailed data that can be used especially for navigation with respect to specific streets, for example, on corporate grounds or with respect to the paths inside parking garages and/or buildings. Then this feature can also make a technical contribution, for example, of performing, for example, also an interior navigation that can also be called, for example, an indoor navigation.

Moreover, a matching of the WGS coordinates that were originally assigned to the personalized information can be carried out by means of the geographic coordinates determined with the transformation module and can be adapted to the location reference as a function of the matching.

In addition, the respective personalized information can also be assigned a user reference and, in this way, enable a user personalized information output. Correspondingly the same applies to the corresponding program functions.

Figure 3:
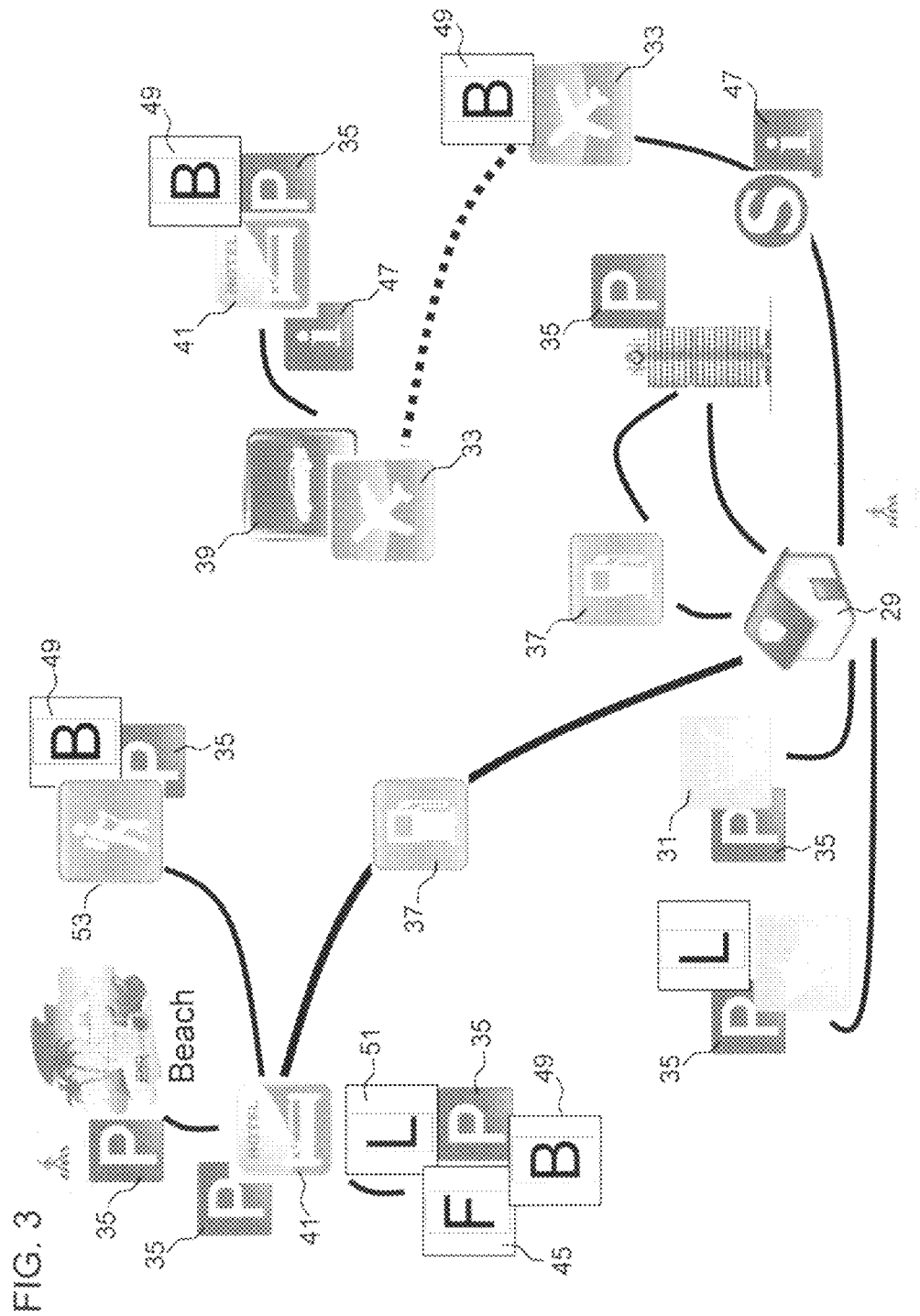
FIG. 3 shows a personalized map.

FIG. 3 shows a personalized map that has been suitably prepared by use of the graphical user interface. Each browser symbol 49 is assigned a link that is activated, for example, on reaching the respective location or in the corresponding perimeter before reaching the corresponding location.

Moreover, there may be, for example, a symbol for a corresponding hiking trail 53. Furthermore, there may also exist symbols not only for the residence but also for a work place, a supermarket, a vacation spot, a theater, relatives or the like. At the same time these locations with their assigned symbols may be linked by means of the type of motion option. For example, a part of a route may be provided for traveling on foot, by public transportation, with an airplane, with a rental car, with one's own car, with a bicycle and/or with a ship.

The dashed lines in FIG. 3 represent various routes or route segments.

When the moveable object—that is, for example, the motor vehicle—is in motion, then the position-determining device determines the position-measuring signal and preferably also determines the current time. Then as a function thereof, the personalized information and/or the program functions with the corresponding location and time reference are selected and provided. Thus, for example, a corresponding photo of the vacation spot is sent, when the moveable object approaches it. Furthermore, on approaching, for example, a gas station, a hyperlink that includes, for example, fuel prices, can be automatically activated. In this way the user can be presented this information in a targeted way. For example, on approaching a parking garage, to which the user drives on a routine basis, for example, on the current route and at the current time of day, the availability of the parking places can be checked automatically, and a corresponding result can be signaled to the user. Moreover, on approaching, for example, a train station of the local public transit system, the current departure times can be retrieved and signaled in a targeted way to the user. Furthermore, it is possible to send e-mails that are intended for a specific location to be displayed on the optical output device 13 on reaching this location.

In addition, a to-do list—that is, a list of tasks—can also be integrated, for example, as personalized information. On reaching the respective location, this to-do list can be displayed on the optical output device. In this way the user can be quickly informed about the tasks that he must do at this location. In addition, the second user device can also be configured to remind the user in advance about any necessary things or materials or information that are required to perform the corresponding tasks at the location, towards which he is headed. In addition, it is also possible to register electronically identifiable objects that have, for example, RFID tags and that are assigned, for example, the respective current position or route when they are brought, for example, into the vehicle. Then these data items can also be made available after the trip, or a matching between the planned objects and those that are actually present can be carried out.

In this way, parts of a so-called product memory can also be realized.

The program functions can include, for example, payment functions. Then a parking garage operator, a toll station or the like can offer its customers a corresponding program function, with which the customer can then execute a so-called drive-thru payment action. Furthermore, on reaching specified locations and/or at specified times a variety of lights can be activated, for example, or a specified piece of music can play.

For example, on approaching a hotel, reservation information can be optically displayed, or a reservation confirmation received by e-mail can be displayed, for example. Furthermore, in this case it is also possible, in principle, to notify the hotel of the scheduled arrival in the near future. For example, on reaching an amusement park the electronic admission tickets can be sent, for example, over a communications interface 23, thus permitting, for example, an automated access. For example, on approaching an airport, the assigned information about the check-in or the like can already be displayed, or an electronic ticket can be suitably provided, for example, also sent over the communications interface 23, and in this way an electronic check-in can already be made, for example.

In principle, the mobile object can be any mobile object; it can be, for example, a passenger car, a truck, a motorcycle, a ship or a bicycle.

An automatic synchronization of the personalized information and also the program functions especially over the central computer system 9 also makes it possible to reconstruct and evaluate a route on which a vehicle has traveled before, when the traveled route is automatically recorded, for example with the respective position data, and these data items are then made available to the other or at least one other user device 5, 7, for example, by way of the central computer system 9.

In this way other members of a community can be provided with the respective personalized information. Suitable platforms for social networks on the Internet, such as Xing or Facebook, can be used for this purpose. Preferably the communication takes place over the user device interfaces 15, 17, 19 and/or the interfaces 21 of the central computer system 9 for communicating with one of the user devices 5, 7, 9 and preferably also encoded over the communications interface 23 for sending information from the first user device and, if desired, only after successful authentication and also by means of respective authentication.

In principle, the respective first to third user devices 3, 5, 7 can also have the functionality of each of the other user devices.

| Table of Reference Numerals | |
|---|---|
| 1 | information system |
| 3 | first user device |
| 5 | second user device |
| 7 | third user device |
| 9 | central computer system |
| 13 | optical output device |
| 15, 17, 19 | user device interfaces |
| 21 | interface of the central computer system |
| 23 | communications interface |
| 29 | house |
| 30 | graphical representation |
| 31 | shopping cart |
| 32 | block |
| 33 | airport symbol |
| 35 | parking garage symbol |
| 37 | gas station symbol |
| 39 | rental station symbol |
| 41 | hotel symbol |
| 43 | public local transit system symbol |
| 45 | amusement park symbol |
| 47 | information center symbol |
| 49 | browser symbol |
| 51 | Internet lexicon symbol |
| 53 | hiking trail |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an information system, the method comprising the acts of:
   determining a current position of a moveable object as a function of at least one position-measuring signal;
   determining a current time;
   selecting, automatically in response to and as a function of the determined current position of the moveable object and the determined current time, at least one piece of personalized information with a location reference that corresponds to the current position of the moveable object and a time reference that corresponds to the current time; and
   displaying, on a display of a user device in communication with said information system, the at least one piece of personalized information, said displaying being performed automatically in response to said selecting.

2. The method as claimed in claim 1, wherein the personalized information is provided as an optical output or an output over a communications interface.

3. The method as claimed in claim 1, further comprising the acts of:
   assigning the location reference in a form of WGS coordinates to the personalized information;
   wherein the assigning act is carried out by graphically placing a symbol for the personalized information on a graphic representation of a geographic region via a graphical user interface.

4. The method as claimed in claim 3, wherein the location reference in the form of WGS coordinates and additional map-based additional geographic information are assigned by graphically placing the symbol for the personalized information on the graphic representation of the geographic region.

5. The method as claimed in claim 3, wherein alphanumeric address data assigned to the personalized information are transformed into geographic coordinates by a transformation module and are assigned, as the location reference, to the personalized information.

6. The method as claimed in claim 4, wherein alphanumeric address data assigned to the personalized information are transformed into geographic coordinates by a transformation module and are assigned, as the location reference, to the personalized information.

7. The method as claimed in claim 5, wherein a matching of the WGS coordinates with the geographic coordinates, determined with the transformation module, is carried out, and the location reference is adapted as a function of the matching.

8. The method as claimed in claim 6, wherein a matching of the WGS coordinates with the geographic coordinates, determined with the transformation module, is carried out, and the location reference is adapted as a function of the matching.

9. The method as claimed in claim 3, wherein the personalized information is assigned a route.

10. The method as claimed in claim 3, wherein the personalized information is assigned a user reference.

11. An apparatus, comprising:
    a user device, the user device comprising a display and being operatively configured to:
       determine a current position of a moveable object as a function of at least one position-measuring signal,
       determine a current time,
       select, automatically in response to and as a function of the determined current position of the moveable object and the determined current time, at least one piece of personalized information with a location reference that corresponds to the current position of the moveable object and a time reference that corresponds to the current time, and
       display, on the display of the user device and automatically in response to said selection, the at least one piece of personalized information.

12. The apparatus as claimed in claim 11, wherein the user device comprises an interface capable of communicating with a central computer system and at least one of sending the personalized information to the central computer system and receiving the personalized information from the central computer system.

13. The apparatus as claimed in claim 12, wherein the user device is designed for a fixed arrangement in a vehicle.

14. The apparatus as claimed in claim 13, wherein the use device is designed as a mobile terminal device with a mobile communications interface.

15. A system, comprising:
    an information system with a central computer system and at least one user device,
    wherein the user device comprises a display and is operatively configured to:
       determine a current position of a moveable object as a function of at least one position-measuring signal,
       determine a current time,
       select, automatically in response to and as a function of the determined current position of the moveable object and the determined current time, at least one piece of personalized information with a location reference that corresponds to the current position of the moveable object and a time reference that corresponds to the current time, and display, on the display of the user device and automatically in response to said selection, the selected at least one piece of personalized information, wherein the central computer system comprises a database and an interface for communicating with the user device, wherein the database is operatively configured to store the personalized information with at least one of the location reference and the time reference, and wherein the database is further operatively configured for synchronizing the personalized information with the user device.

16. The system as claimed in claim 15, wherein the information system comprises a first user device and a second user device.

* * * * *